United States Patent
Greenwood et al.

(10) Patent No.: US 9,187,647 B2
(45) Date of Patent: Nov. 17, 2015

(54) AQUEOUS SILANIZED SILICA DISPERSION

(75) Inventors: Peter Harry Johan Greenwood, Gothenburg (SE); Hans Lagnemo, Gothenburg (SE); Martin Lagnemo, Gothenburg (SE)

(73) Assignee: AKZO NOBEL CHEMICALS INTERNATIONAL B.V., Amersfoort (NL)

(*) Notice: Subject to any disclaimer, the term of this patent is extended or adjusted under 35 U.S.C. 154(b) by 0 days.

(21) Appl. No.: 13/254,980

(22) PCT Filed: Mar. 10, 2010

(86) PCT No.: PCT/EP2010/053001
§ 371 (c)(1),
(2), (4) Date: Nov. 21, 2011

(87) PCT Pub. No.: WO2010/103020
PCT Pub. Date: Sep. 16, 2010

(65) Prior Publication Data
US 2012/0059089 A1 Mar. 8, 2012

Related U.S. Application Data

(60) Provisional application No. 61/159,947, filed on Mar. 13, 2009.

(30) Foreign Application Priority Data

Mar. 13, 2009 (EP) .................................. 09155124

(51) Int. Cl.
| | | |
|---|---|---|
| *B32B 9/00* | (2006.01) |
| *C09C 1/30* | (2006.01) |
| *B82Y 30/00* | (2011.01) |
| *C01B 33/14* | (2006.01) |
| *C01B 33/146* | (2006.01) |
| *C01B 33/148* | (2006.01) |
| *C01B 33/149* | (2006.01) |
| *C09D 7/12* | (2006.01) |
| *C08K 3/36* | (2006.01) |
| *C08K 9/06* | (2006.01) |

(52) U.S. Cl.
CPC .............. *C09C 1/3081* (2013.01); *B82Y 30/00* (2013.01); *C01B 33/14* (2013.01); *C01B 33/146* (2013.01); *C01B 33/148* (2013.01); *C01B 33/149* (2013.01); *C09D 7/1225* (2013.01); *C01P 2002/52* (2013.01); *C01P 2004/62* (2013.01); *C01P 2004/64* (2013.01); *C01P 2006/12* (2013.01); *C01P 2006/22* (2013.01); *C08K 3/36* (2013.01); *C08K 9/06* (2013.01)

(58) Field of Classification Search
CPC .................................. C09C 1/3081; C08K 9/06
USPC ....................... 428/405; 523/212; 106/287.11
See application file for complete search history.

(56) References Cited

U.S. PATENT DOCUMENTS

| | | | |
|---|---|---|---|
| 2,630,410 A | | 3/1953 | Clapsadle et al. |
| 4,348,462 A | * | 9/1982 | Chung .......................... 428/412 |
| 4,355,135 A | * | 10/1982 | January ......................... 524/767 |
| 4,732,787 A | * | 3/1988 | Vantillard et al. ............ 427/386 |
| 4,747,987 A | * | 5/1988 | Brauer et al. ................. 264/182 |
| 5,221,560 A | * | 6/1993 | Perkins et al. ................ 427/515 |
| 5,368,833 A | | 11/1994 | Johansson et al. |
| 5,925,288 A | * | 7/1999 | Umamori et al. ............. 252/572 |
| 6,620,514 B1 | * | 9/2003 | Arpac et al. .................. 428/447 |
| 2003/0157344 A1 | | 8/2003 | Shoup et al. |
| 2004/0029834 A1 | * | 2/2004 | Schiestel et al. ................ 514/63 |
| 2005/0020758 A1 | | 1/2005 | Terry |
| 2007/0155896 A1 | * | 7/2007 | Motoyama et al. ........... 524/837 |
| 2008/0245260 A1 | | 10/2008 | Campazzi et al. |

FOREIGN PATENT DOCUMENTS

| | | |
|---|---|---|
| CN | 1816590 | 8/2006 |
| EP | 1199337 | 4/2002 |
| EP | 1978024 | 10/2008 |
| EP | 1978055 | 10/2008 |
| EP | 1554221 | 7/2009 |
| FR | 2899906 | 10/2007 |
| JP | 01156335 | 6/1989 |
| JP | 01304144 | 12/1989 |
| JP | 2000234059 | 8/2000 |
| JP | 2006503156 | 1/2006 |
| TW | 200902320 | 1/2009 |
| WO | WO 2004/035474 | 9/2003 |
| WO | 2005003218 | 1/2005 |

OTHER PUBLICATIONS

International Search Report and Written Opinion, PCT International Application PCT/EP2010/053001, date mailed May 4, 2010.
International Preliminary Report on Patentability, PCT International Application PCT/EP2010/053001, completed. Jun. 21, 2011.
Reply to Written Opinion, PCT International Patent Application No. PCT/EP2010/053001, dated. Jan. 12, 2011.
Iler, K. Ralph, "The Chemistry of Silica", John Wiley & Sons, 1979, pp. 407-409.
Iler, R.K. and Dalton, R.L., J. Phys. Chem., 60(1956), pp. 955-957.
Iler, Ralph K., The Chemistry of Silica, John Wiley & Sons, Inc., 1979, pp. 344-345.

(Continued)

*Primary Examiner* — Margaret Moore
(74) *Attorney, Agent, or Firm* — Kenyon & Kenyon LLP

(57) ABSTRACT

The present invention relates to a method of producing an aqueous dispersion of silanized colloidal silica particles comprising mixing in an aqueous medium a) at least one silane compound containing an epoxy-functionality, b) at least one silane compound having no epoxy-functionality capable of modifying colloidal silica particles; and c) colloidal silica particles in any order to form an aqueous dispersion of silanized colloidal silica particles containing silane compounds originating from a) and b). It also relates to a dispersion obtainable by said method and to the use thereof in coating applications.

14 Claims, No Drawings

(56) References Cited

OTHER PUBLICATIONS

English Translation of Chinese Office Action received in Chinese Application No. 2010001057606.6, mailed on Jan. 17, 2013.

Taiwanese Office Action received in Taiwanese Application No. 099107352, mailed on Feb. 20, 2014.

Third Party Observations for JP Patent Application No. 2011-553434, dated on Apr. 23, 2014.

* cited by examiner

AQUEOUS SILANIZED SILICA DISPERSION

REFERENCE TO RELATED APPLICATION(S)

This application is the U.S. National Phase of PCT/EP2010/053001 filed on Mar. 10, 2010, and claims the benefit of U.S. Provisional Application No. 61/159,947, filed on Mar. 13, 2009.

The present invention relates to a method of providing an aqueous dispersion comprising silanized colloidal silica particles wherein the silane groups originate from a) at least one silane compound containing epoxy functionality, b) at least one silane compound having no epoxy-functionality which is capable of modifying colloidal silica particles which can be obtained by mixing silane compounds containing precursors of silane groups a) and b), and colloidal silica particles in any order to form the dispersion of silanized colloidal silica particles. The invention also relates to the use of the silanized colloidal silica dispersion.

BACKGROUND OF THE INVENTION

Colloidal silica dispersions have previously been used inter alia as coating material to improve adhesive properties and increase wear and water resistance of various materials. However, these compositions, especially highly concentrated colloidal silica compositions, may be liable to gelling or precipitation, which considerably shortens the storage time.

EP 1554221 discloses a method of providing a dispersion of silane-modified silica. However, the stability of such dispersions may not always provide sufficient stability, hardness, and/or water resistance.

It would be desirable to provide an improved silanized silica sol dispersion with regard to the above deficiencies of the prior art. It would also be desirable to provide a highly concentrated colloidal silica dispersion for inter alia coating applications which can be easily stored and transported without any initial precipitation. A further object is to provide a dispersion imparting high water resistance and/or hardness, in particular early hardness, to lacquer formulations. It would also be desirable to provide a convenient and inexpensive method of producing such a dispersion.

A further object is to provide a dispersion suitable for wood lacquers which does not discolour the wood, for example oak. It is a further object of the invention to provide improved water resistance of wood lacquer formulations.

THE INVENTION

The present invention relates to a method of producing an aqueous dispersion of silanized colloidal silica particles comprising mixing in an aqueous medium a) at least one silane compound containing an epoxy-functionality, b) at least one silane compound having no epoxy-functionality which is capable of modifying colloidal silica particles; and c) colloidal silica particles in any order to form an aqueous dispersion of silanized colloidal silica particles containing silane groups originating from a) and b).

According to one embodiment, the silanized colloidal silica particles are capable of imparting hardness and/or water resistance to lacquers.

According to one embodiment, b) is selected from silanes with amido-functionality, ureido-functionality, amino-functionality, ester functionality, mercapto functionality, and/or isocyanato functionality, for example from silanes with amido-functionality, ureido-functionality, and/or amino-functionality, for example amido and/or an ureido functionality.

According to one embodiment, the weight ratio of b) to a) ranges from about 2 to about 0.1, for example from about 1.5 to about 0.2, or from about 1.1 to about 0.4.

According to one embodiment, the weight ratio of both a) and b) to silica ranges from about 0.01 to about 3, for example from about 0.01 to about 1.5, for example from about 0.05 to about 1, or from about 0.10 to about 0.5, or from about 0.2 to about 0.5, or from about 0.3 to about 0.5.

According to one embodiment, the amido-functionality comprises (meth)acryl amide groups. According to one embodiment, silane with amido-functionality includes for example ethylenically unsaturated, silane-containing monomers of meth(acrylamides) containing silane groups of the general formula (II) $CH_2=CR^5—CO—NR^6—R^7—SiR^8_m$, $—(R^9)_{3-m}$, where m=0 to 2, $R^5$ is either H or a methyl group, $R^6$ is H or an alkyl group having 1 to 5 carbon atoms; $R^7$ is an alkylene group having 1 to 5 carbon atoms or a divalent organic group in which the carbon chain is interrupted by an O or N atom, $R^8$ is an alkyl group having 1 to 5 carbon atoms, and $R^9$ is an alkoxy group having 1 to 40 carbon atoms, which may be substituted by further heterocycles. In monomers in which two or more $R^5$ or $R^9$ groups occur, these groups may be identical or different. Examples of (meth)acrylamido-alkylsilanes of this kind are 3-(meth)acrylamido-propyltrimethoxysilanes, 3-(meth)-acrylamido-propyltriethoxysilanes, 3-(meth)acrylamido-propyltri(β-methoxyethoxy)silanes, 2-(meth)acrylamido-2-methylpropyltrimethoxysilanes, 2-(meth)acrylamido-2-methylethyltrimethoxysilanes, N-(2-(meth)acrylamido-ethyl)aminopropyltrimethoxysi lanes, 3-(meth)acrylamido-propyltriacetoxysilanes, 2-(meth)acrylamido-ethyltrimethoxysilanes, 1-(meth)acrylamido-methyltrimethoxysilanes, 3-(meth)acrylamido-propylmethyldimethoxysilanes, 3-(meth)acrylamido-propyldimethylmethoxysilanes, 3-(N-methyl-(meth)acrylamido)-propyltrimethoxysilanes, 3-((meth) acrylamido-methoxy)-3-hydroxy-propyltrimethoxysilanes, 3-((meth) acrylamido-methoxy)-propyltrimethoxysilanes, N,N-dimethyl-N-trimethoxy-silylpropyl-3-(meth)acrylamido-propylammonium chloride and N,N-dimethyl-N-trimethoxysilylpropyl-2-(meth)acryl-amido-2-methylpropylammonium chloride.

According to one embodiment, silane with ureido functionality includes for example β-ureidoethyl-trimethoxysilane, β-ureidoethyl-triethoxysilane, γ-ureidoethyltrimethoxysilane, and/or γ-ureidopropyl-triethoxysilane.

According to one embodiment, silane with ureido functionality may have the structure $B_{(4-n)}Si-(A-N(H)—C(O)—NH_2)_n$, wherein A is an alkylene group containing from 1 to about 8 carbon atoms, B is a hydroxyl or alkoxy group containing from 1 to about 8 carbon atoms, and n is an integer from 1 to 3 provided that if n is 1 or 2, each B may be the same or different.

According to one embodiment, silane with epoxy functionality includes for example glycidoxy and/or a glycidoxypropyl group such as gamma-glycidoxypropyl trimethoxysilane, gamma-glycidoxypropyltriethoxy silane, methyldiethoxysilane gamma-glycidoxypropyl methyldiethoxysilane, (3-glycidoxypropyl)trimethoxy silane, (3-glycidoxypropyl)hexyltrimethoxy silane, beta-(3,4-epoxycyclohexyl)-ethyltriethoxysilane.

According to one embodiment, silane with epoxy functionality includes at least one glycidoxy or glycidoxypropyl group, particularly gamma-glycidoxypropyltrimethoxysilane and/or gamma glycidoxypropylmethyldiethoxysilane.

According to one embodiment, silane with mercapto functionality includes 3-mercaptopropyltrimethoxysilane, $HS(CH_2)_3$, $Si(OCH_3)_3$, mercaptosilane possessing at least one hydroxyalkoxysilyl group and/or a cyclic dialkoxysilyl group, gamma-mercaptopropyl trimethoxysilane, gamma-mercaptopropyl triethoxysilane.

According to one embodiment, silane with amino-functionality is selected from aminomethyltriethoxysilane, N-(β-aminoethyl)aminomethyltrimethoxysilane, aminomethylmethyl diethoxysilane, N-(β-aminoethyl) methyltriethoxysilane, γ-aminopropyltriethoxysilane, γ-aminopropylmethyldiethoxysilane, γ-aminoisobutyltrimethoxysilane, N-(β-aminoethyl)-γ-aminopropyltrimethoxysilane, and N-(β-aminoethyl)-γ-aminopropylmethyldimethoxysilane. Further specific examples of the above silane functionalities which may be used include those mentioned in U.S. Pat. No. 5,928,790, hereby incorporated by reference.

According to one embodiment, the silane compounds can be mixed in any order with the colloidal silica particles. According to one embodiment, at least one silane compound with epoxy functionality is mixed with the colloidal silica particles before mixing it with at least one silane compound b).

According to one embodiment, the silane compound with epoxy functionality is mixed with the colloidal silica particles after the silica has been modified with silane compound b), for example amine-functionality silane.

According to one embodiment, the silane compounds a) and b) are mixed with colloidal silica particles at a pH below 12, for example below 11, below 10 or below 9.5. According to one embodiment, the mixing of silane compounds, for example silane with amino-functionality, is performed at a pH above 10, for example above 11.

According to one embodiment, the mixing of silane compounds and colloidal silica particles may be carried out at a pH from about 1 to about 13, such as from about 6 to about 12, or from about 7.5 to about 11, or from about 9 to about 10.5.

The mixing of silane and colloidal silica particles can be carried out continuously, for example at a temperature from about 20 to about 95, such as from about 50 to about 75, or from about 60 to about 70° C. Silane is for example slowly added to the silica particles under vigorous agitation at a temperature of about 60° C. and at a controlled rate, which suitably is from about 0.01 to about 100, such as from about 0.1 to about 10, from about 0.5 to about 5, or from about 1 to about 2 silane molecules per $nm^2$ colloidal silica surface area (on the colloidal silica particles) and hour. The addition of silane can be continued for any suitable time depending on the addition rate, amount of silane to be added, and degree of desired silylation. However, the addition of silane can be continued up to about 5 hours, or up to about 2 hours until a suitable amount of silane compounds a) and b) have been added. The amount of a) and b) added to the colloidal silica particles suitably is from about 0.1 to about 6, such as from about 0.3 to about 3, or from about 1 to about 2 silane molecules per $nm^2$ surface area of the colloidal silica particles. Continuous addition of silane to the colloidal particles may be particularly important when preparing highly concentrated silanized silica dispersions having a silica content up to about 80 wt %. However, the silica content in the dispersion suitably is from about 20 to about 80, from about 25 to about 70, or from about 30 to about 60 wt %.

According to one embodiment, at least one of the silane compounds a) and b), for example a) is diluted before mixing it with the colloidal silica particles, e.g. with water to form a premix of silane and water, suitably in a weight ratio of from about 1:8 to about 8:1, from about 3:1 to about 1:3, or from about 1.5:1 to about 1:1.5. The resulting silane-water solution is substantially clear and stable and easy to mix with the colloidal silica particles. At continuous addition of silane to the colloidal silica particles, the mixing can be continued from about 1 second to about 30 minutes, for example from about 1 to about 10 minutes after the addition of silane stopped.

According to one embodiment, the relative increase in viscosity of the dispersion two months after the preparation thereof is lower than about 100%, such as lower than about 50%, or lower than about 20%. According to one embodiment, the relative increase in viscosity of the dispersion four months after the preparation thereof is lower than about 200%, such as lower than about 100%, or lower than about 40%.

The colloidal silica particles, also referred to as silica sols herein, may be derived from e.g. precipitated silica, micro silica (silica fume), pyrogenic silica (fumed silica) or silica gels with sufficient purity, and mixtures thereof; they may be silanised by way of the method described in WO2004/035474. The silica sol may also, typically, be obtained from waterglass as disclosed in e.g. U.S. Pat. No. 5,368,833.

Colloidal silica particles and silica sols according to the invention may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, for example from about 0.1 to about 2 wt %. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The colloidal silica particles suitably have an average particle diameter ranging from about 2 to about 150 nm, from about 3 to about 50 nm, from about 5 to about 40 nm, or from about 7 to about 22 nm. Suitably, the colloidal silica particles have a specific surface area from about 20 to about 1500, such as from about 50 to about 900, from about 70 to about 600 $m^2/g$, or from about 130 to about 360 $m^2/g$.

According to one embodiment, the colloidal silica particles can have a narrow particle size distribution, i.e. a low relative standard deviation of the particle size.

According to one embodiment, the relative standard deviation of the particle size distribution is the ratio of the standard deviation of the particle size distribution to the mean particle size by numbers. The relative standard deviation of the particle size distribution is lower than about 60% by numbers, such as lower than about 30% by numbers, or lower than about 15% by numbers.

The colloidal silica particles are suitably dispersed in an aqueous medium, suitably in the presence of stabilising cations such as $K^+$, $Na^+$, $Li^+$, $NH_4^+$, organic cations, primary, secondary, tertiary, and quaternary amines, or mixtures thereof so as to form an aqueous silica sol. However, also dispersions comprising organic media, e.g. lower alcohols, acetone or mixtures thereof may be used, suitably in an amount of from about 1 to about 20, from about 1 to about 10, or from about 1 to about 5 volume percent of the total dispersing medium volume. According to one embodiment, aqueous silica sols without any further organic media are used. According to one embodiment, the colloidal silica particles are negatively charged. Suitably, the silica content in the sol is from about 20 to about 80, such as from about 25 to about 70, and from about 30 to about 60 wt %. The higher the silica content, the more concentrated the resulting silanized colloidal silica dispersion. The pH of the silica sol suitably is from about 1 to about 13, from about 3.5 to 12, from about 6 to about 12, or from about 7.5 to about 11.

According to one embodiment, the silica sol has an S-value from about 20 to about 100, such as from about 30 to about 90, or from about 60 to about 90%.

It has been found that dispersions with an S-value within these ranges can improve the stability of the resulting dispersion. The S-value characterises the extent of aggregation of colloidal silica particles, i.e. the degree of aggregate or microgel formation. The S-value has been measured and calculated according to the formulas given in J. Phys. Chem. 60 (1956), 955-957 by Iler, R. K. & Dalton, R. L.

The S-value depends on the silica content, the viscosity, and the density of the colloidal silica particles. A high S-value indicates a low microgel content. The S-value represents the amount of $SiO_2$ in percent by weight present in the dispersed phase of e.g. a silica sol. The degree of microgel can be controlled during the production process as further described in e.g. U.S. Pat. No. 5,368,833.

The silane compounds can form stable covalent siloxane bonds (Si—O—Si) with the silanol groups or be linked to the silanol groups, e.g. by hydrogen bondings, on the surface of the colloidal silica particles.

According to one embodiment, the aqueous dispersion of the silanized colloidal silica particles are mixed with a lacquer such as a waterborne/water-based (or water miscible) lacquer, for example based on a resin such as dispersions or emulsions of epoxy, polyurethane, acrylic, polyester, alkyd resins, for use in wood coatings, metal coatings, plastic coatings, paper coating or coatings of glass and ceramics or mineral substrates.

In general, the term lacquer comprises any clear or coloured varnish that dries by solvent evaporation and often a curing process as well that produces a hard, durable finish, in any sheen level from ultra matte to high gloss and that can be further polished as required.

According to one embodiment, an organic binder is added to the dispersion of the silanized colloidal silica particles. The term "organic binder" includes latex, water soluble resins and polymers and mixtures thereof. Water soluble resins and polymers can be of various types such as e.g. poly(vinyl alcohols), modified poly(vinyl alcohols), polycarboxylates, poly(ethylene glycols), poly(propylene glycols), polyvinylpyrrolidones, polyallylamines, poly(acrylic acids), polyamidamines polyacrylamides, polypyrroles, proteins such as casein, soybean proteins, synthetic proteins, polysaccharides such as cellulose derivatives including methylcelluloses, ethylcelluloses, hydroxyethylcelluloses, methylhydroxyethylcelluloses, ethylhydroxyethylcelluloses or carboxymethylcelluloses, and starches or modified starches; chitosan, polysaccharide gums such as e.g. guar gums, arabic gums, xanthan gums and mastic gums and mixtures or hybrids thereof. The term "latex" includes synthetic and/or natural latices based on emulsions of resins and/or polymers of various types, e.g. styrene-butadiene polymers, butadiene polymers, polyisoprene polymers, butyl polymers, nitrile polymers, vinylacetate homopolymers, acrylic polymers such as vinylicacrylic copolymers or styrene-acrylic polymers, polyurethanes, epoxy polymers, cellulosic polymers; e.g. micro cellulose, melamine resins, neoprene polymers, phenol based polymers, polyamide polymers, polyester polymers, polyether polymers, polyolefin polymers, polyvinyl butyral polymers, silicones such as silicone rubbers and silicone polymers (e.g. silicone oils), urea-formaldehyde polymers, vinyl polymers or mixture or hybrids thereof.

According to one embodiment, the dispersion of silanized colloidal silica particles is mixed with a lacquer, such as a waterborne lacquer, for example wood or epoxy lacquer, in a weight ratio of silica to lacquer on a dry base from about 0.01 to about 4, such as from about 0.1 to about 2, or from about 0.2 to about 1, or from about 0.2 to about 0.5. In a similar way, the silanized particles can be mixed with an organic binder in the same proportions. According to one embodiment, the silanized colloidal silica particles are mixed with a further component such as an organic binder or a lacquer at moderate temperature, suitably from about 15 to about 35° C., or from about 20 to about 30° C. According to one embodiment, the components are mixed from about 10 seconds to about 1 hour, or from about 1 minute to about 10 minutes.

The invention further relates to an aqueous dispersion obtainable by the method as described herein. In particular, the invention relates to an aqueous dispersion comprising silanized colloidal silica particles, wherein the silanized colloidal silica particles comprise silane groups of a) at least one silane compound containing an epoxy-functionality, and b) at least one silane compound having no epoxy-functionality.

According to one embodiment, said silanes are capable of modifying colloidal silica particles. The silane groups can originate from any silane compounds as disclosed herein.

The components of the dispersion suitably have technical features as disclosed herein in the method portion.

The aqueous dispersion is capable of forming a coating film on various kinds of substrates.

According to one embodiment, the aqueous dispersion further comprises a lacquer, for example a waterborne lacquer. The aqueous dispersion is capable of imparting improved hardness, especially early hardness, and/or water resistance to a lacquer formulation.

According to one embodiment, the dispersion has a silica content from about 1 to about 80, such as from about 10 to about 70, from about 20 to about 50 wt % based on the dry material in the dispersion. Besides being more efficient in terms of stability, the dispersion has shorter time of drying after application on a material to be coated.

The energy used for drying can thus be considerably reduced. A high silica content in the dispersion is preferred as long as the silanized colloidal silica particles remain stably dispersed without any substantial aggregation, precipitation and/or gelation. This is beneficial also in view of the reduced transportation cost thereof.

According to one embodiment, the weight ratio of both a) and b) to silica in the dispersion is from about 0.01 to about 3, for example from about 0.01 to about 1.5, such as from about 0.05 to about 1, or from about 0.1 to about 0.5, or from about 0.2 to about 0.5, or from about 0.3 to about 0.5. According to one embodiment, the weight ratio of b) to a) ranges from about 2 to about 0.1, for example from about 1.5 to about 0.2, or from about 1.1 to about 0.4.

The content of silica comprises silica in modified silanized silica particles and non-modified silica particles which also may be present in the prepared dispersion. The total content of silane is based on all freely dispersed silane and all linked or bound silane groups.

According to one embodiment, the dispersion further contains an organic binder such as a latex, as further described herein. The total solid content of the dispersion comprising organic binder and silanized colloidal silica particles suitably is from about 15 to about 80, such as from about 25 to about 65, or from about 30 to about 50 wt %. The weight ratio of silica to organic binder on a dry base is suitably in the range from about 0.01 to about 4, such as from about 0.1 to about 2, or from about 0.2 to about 1.

According to one embodiment, the silanized colloidal silica particles and the organic binder are present as discrete particles in the dispersion.

The stability of the dispersion facilitates the handling and application thereof in any use since it allows for storage and need not be prepared on site immediately before usage. The already prepared dispersion can thus easily be directly used. The dispersion is also beneficial in the sense that it does not involve hazardous amounts of toxic components. The aqueous dispersion may contain a water-miscible organic medium. For example, a suitable organic medium miscible with water may be comprised in the aqueous dispersion in an amount from about 1 to about 20, for example in an amount from about 1 to about 10, or from about 1 to about 5 volume percent of the total volume of water and organic medium.

The dispersion may contain besides silanized colloidal silica particles also, at least to some extent, non-silanized colloidal silica particles depending on the size of the silica particles, weight ratio of silane to silica, type of silane compound, reaction conditions etc. Suitably, at least about 40 of the colloidal silica particles are silanized (silane-modified), for example at least about 65, or at least about 90, or at least about 99 wt %. The dispersion may comprise besides silane in the form of silane groups or silane derivatives bound or linked to the surface of the silica particles also at least to some extent freely dispersed unbound silane compounds. Suitably, at least about 40, for example at least about 60, at least about 75, at least about 90, or at least about 95 wt % of the silane compounds are bound or linked to the surface of the silica particles.

The invention further relates to lacquer formulations comprising the silanized silica colloidal particles as described herein.

The invention also relates to the use of the silanized colloidal silica dispersion in coating applications such as in lacquer formulations, for example wood lacquers or epoxy lacquers, as additives to impart improved water resistance, hardness, in particular early hardness, and stability. Also, the dispersions of the invention may impart improved adhesiveness and wear resistance. The dispersion of the invention can also provide improved sandability (polishability) and flow properties. This kind of dispersions can also offer better film properties in pigmented systems, such as paints.

The dispersion is also suitable for coating and impregnating woven and nonwoven textiles, bricks, photo paper, wood, metal surfaces such as steel or aluminium, plastic films such as e.g. polyester, PET, polyolefins, polyamide, polycarbonates, or polystyrenes; fabrics, leather, paper and paper-like materials, ceramics, stone, cementitious materials, bitumen, hard fibres, straw, glass, porcelain, plastics of a variety of different types, glass fibres for e.g. antistatic and grease-resistant finishing; as binders for nonwovens, adhesives, adhesion promoters, laminating agents, sealants, hydrophobizing agents, as binders, for example, for cork powder or sawdust, asbestos, and rubber waste; as auxiliaries in textile printing and in the paper industry; as additives to polymers as sizing agents, for example, for glass fibres; and for finishing leather.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following examples will further illustrate how the described invention may be performed without limiting the scope of it.

All parts and percentages refer to part and percent by weight, if not otherwise stated.

EXAMPLES

Silanes A-E used below are available from Momentive in Switzerland

A: Silquest A-187 (glycidoxy-containing epoxy-silane)
B: Silquest A-1524 (ureido-containing silane)
C: Silquest A-1100 (amino-containing silane)
D: Silquest A-1130 (amino-containing silane)
E: Silquest A-178 (acrylamido-containing silane)

Hydrolysis of Silane

Silane compounds A-E were added to pH adjusted water under moderate agitation at room temperature whereby clear solutions were obtained after 60-120 minutes.

TABLE 1

Used silanes

| Silane No | Silane content (wt %) | Amount of water (g) | Amount of silane (g) | pH of water for hydrolysis | pH of pre-hydrolysed silane |
|---|---|---|---|---|---|
| A | 50 | 100 | 100 | 7 | 7 |
| B | 50 | 100 | 100 | 2.6 | 4 |
| C | 50 | 100 | 100 | 7 | 11 |
| D | 50 | 100 | 100 | 7 | 11 |
| E | 50 | 100 | 100 | 3 | 4 |

The silica sol Bindzil 30/360 used, available from Eka Chemicals AB, Sweden, is shown in table 2 below:

TABLE 2

Used silica sol - non-surface modified

| Sol No | Silica sol | Amount of Silica sol (g) | Silica content (wt %) | Particle size, (nm) | Surface modification | pH |
|---|---|---|---|---|---|---|
| A1 | Bindzil ® 30/360 | 5000 | 30 | 7 | None | 9-10 |

TABLE 3

Used waterborne lacquers

| Trade Name | Type of lacquer | Base material/binder in the lacquer |
|---|---|---|
| Sadolin ® Golvlack Stark (blank) | 2-pack epoxy | Epoxy resin, polyetherdiamine |
| Sadolin ® Parkettlack Helblank | 1-pack wood lacquer | Waterborne acrylic/polyurethane dispersion |

Preparation of Silanized Colloidal Silica Dispersions

Pre-hydrolysed silane solutions A-E (see table 1) were added dropwise to silica sol A1 under good agitation at a rate of 600 g solution per hour. The agitation was continued for about 30 minutes after silane addition.

The process temperature was 60-70° C. Premixed samples of water-diluted silane compounds were prepared by mixing water and silane in equal amounts (see tables 4-6). The mixtures were slowly agitated until clear solutions were obtained. The silane dilutions were then mixed with a silica sol under moderate agitation, unless otherwise stated. Approximately 300 ppm of free epoxy silane did not react with silica particles.

TABLE 4

Silica sols-modified with epoxy silane

| Modified Sol No | Silica sol | Amount of silica sol (g) | Amount of pre-hydrolysed silane, solution A, table 1, (g) | Silica content (wt %) | Particle size, (nm) | pH |
|---|---|---|---|---|---|---|
| B1 | A1 | 5000 | 600 | 30 | 7 | 7* |
| B2 | A1 | 5000 | 600 | 27 | 7 | 10 |
| B3 | A1 | 5000 | 300 | 28 | 7 | 10 |

*pH reduced from pH 10 to 7 by cation exchange of the silylated silica.

TABLE 5

Non-epoxy-silane treated silanized colloidal silica dispersions

| Silanized silica sol No | Silica sol | Silica sol (g) | Pre-hydrolysed silane solutions of table 1 | Silane solution weight (g) | Stable silanized silica sol |
|---|---|---|---|---|---|
| 1 | A1 | 5000 | B | 600 | YES |
| 2 | A1 | 5000 | B | 300 | YES |
| 3 | A1 | 5000 | C | 600 | NO |
| 4 | A1 | 5000 | C | 300 | NO |
| 5 | A1 | 5000 | D | 600 | NO |
| 6 | A1 | 5000 | D | 300 | NO |
| 7 | A1 | 5000 | E | 400 | YES |

TABLE 6

Epoxy-treated silanized colloidal silica dispersions

| Silanized silica sol No | Silica sol | Silica sol (g) | Silane | Amount of pre-hydrolysed silane (g) | Stable silanized silica sol |
|---|---|---|---|---|---|
| 8 | B1 | 5000 | — | — | YES |
| 9 | B2 | 5000 | — | — | YES |
| 10 | B1 | 5000 | B | 600 | YES |
| 11 | B1 | 5000 | B | 300 | YES |
| 12 | B2 | 5000 | C | 600 | YES |
| 13 | B2 | 5000 | D | 600 | YES |
| 14 | B3 | 5000 | D | 300 | YES |
| 15* | B2 | 5000 | E | 360 | YES |
| 16* | B2 | 5000 | E | 400 | YES |

*pH reduced from pH 10.5 to 7.5 by cation exchange of the silylated silica.

TABLE 7

Stability data of the silane modified sols (No 1-7 of table 5) after a month

| Silanized silica sol No | pH | Visc. (cP) | Note |
|---|---|---|---|
| 1 | 11.0 | 4.6 | Only stable at pH 11, Gellation** |
| 2 | 10.7 | 6.5 | Only stable at pH 11, Gellation** |
| 3 | — | — | Not stable, gellation |
| 4 | — | — | Not stable, gellation |
| 5 | — | — | Not stable, gellation |
| 6 | — | — | Not stable, gellation |
| 7 | 10.9 | 5.2 | Not stable at low/neutral pHs** |

**Gellation occurs if pH is reduced to pH 9 or lower either by cation exchange or by addition of acid.

TABLE 8

Stability data of sols No 8-16 (in table 6) after a month

| Silanized silica sol No | pH | Visc. (cP) | Note |
|---|---|---|---|
| 8 | 7.0 | 6.8 | Stable silica sol |
| 9 | 10.9 | 6.7 | Stable silica sol |
| 10 | 8.1 | 11.7 | Stable silica sol |
| 11 | 8.1 | 5.1 | Stable silica sol |
| 12 | 11.5 | 4.5 | Stable silica sol |
| 13 | 11.4 | 3.8 | Stable silica sol |
| 14 | 11.4 | 4.3 | Stable silica sol |
| 15* | 8.3 | 4.0 | Stable silica sol |
| 16* | 8.1 | 3.5 | Stable silica sol |

*pH reduced from pH 10.5 to 7.5 by cation exchange of the silylated silica.

König hardness test was performed after 1, 7, 14, and 30 days for the wood lacquer and epoxy lacquer formulations 1-6 and 7-11 respectively.

Wood Lacquer Formulations (No 1-6)

20 g silane modified colloidal silica was added to 80 g 1-pack water based lacquer under good agitation.

Wood coatings require a formulation with a neutral pH due to discolourisation of oak that takes place if the pH exceeds 8.5. It is therefore necessary to have a silane modified silica sol that is stable at neutral pH and that does not give a pH chock in the coating formulation.

Epoxy Lacquer Formulations (No 7-11)

5 g silane modified silica sol was first added to 10 g 2-pack epoxy lacquer and thereafter 10 g epoxy hardener under good agitation.

Films were cast by a film applicator on glass plates. The wet film thicknesses were 200 μm and the hardness was measured after 1, 7, 14 and 30 days (drying and storage were performed at room temperature).

The test was made with a Konig pendulum hardness tester measuring equipment according to standard ISO 1522 (former ASTM D-4366).

TABLE 9

Wood lacquer formulations with/without addition of silane modified sol

| Formulation No | Wood lacquer | Silica sol | Silica sols (from tables 5 and 6) |
|---|---|---|---|
| 1 | 100 g | — | (reference) |
| 2 | 80 g | 20 g | No 8 (reference) |
| 3 | 80 g | 20 g | No 10 |
| 4 | 80 g | 20 g | No 11 |
| 5 | 80 g | 20 g | No 15 |
| 6 | 80 g | 20 g | No 16 |

TABLE 10 pH and viscosity of the lacquer formulations (No 1-6 in table 9)

| Formulation No | pH | Viscosity (cP, 20 C.) |
|---|---|---|
| 1 | 7.8 | 46 |
| 2 | 7.8 | 26 |
| 3 | 7.9 | 31 |
| 4 | 7.9 | 26 |
| 5 | 7.9 | 26 |
| 6 | 8.1 | 28 |

TABLE 11

Epoxy lacquer formulations with/without of silane modified silica sol

| No | Epoxy lacquer | Hardener | Silica sol | Silica sol (from tables 5 and 6) |
|---|---|---|---|---|
| 7 | 10 g | 10 g | — | (reference) |
| 8 | 10 g | 10 g | 5 g | (reference) |
| 9 | 10 g | 10 g | 5 g | No 12 |
| 10 | 10 g | 10 g | 5 g | No 13 |
| 11 | 10 g | 10 g | 5 g | No 14 |

All lacquer formulations in table 11 are stable in the epoxy lacquer for more than 2 months.

TABLE 12

König hardness (s) for formulations according to table 9

| No | 24 h | 7 days | 30 days | Note |
|---|---|---|---|---|
| 1 | 31 s | 71 s | 85 s | Reference sample |
| 2 | 52 s | 98 s | 110 s | Silica sol modified with only epoxy silane, reference |
| 3 | 61 s | 118 s | 120 s | Silica sol modified epoxy silane and ureido silane |
| 4 | 60 s | 118 s | 119 s | Silica sol modified epoxy silane and ureido silane |
| 5 | 56 s | 104 s | 110 s | Silica sol modified epoxy silane and acrylamido silane |
| 6 | 63 s | 115 s | 123 s | Silica sol modified epoxy silane and acrylamido silane |

As can be noted in table 12, formulations according to No. 3-6 based on dually silanized colloidal silica dispersions show improved early hardness compared to control sample (No. 1) and mono-silanized colloidal silica dispersions (No. 2). It is of considerable importance that development of hardness is rapid since users demand almost instant use in applications such as placement of furniture etc on newly provided floors in which the wood lacquer formulation has been used.

TABLE 13

König hardness (seconds) for formulations according to table 11

| No | 24 h | 30 days | Note |
|---|---|---|---|
| 7 | 27 s | 180 s | Reference sample |
| 8 | 26 s | 178 s | Silica sol modified with only epoxy silane (reference) |
| 9 | 32 s | 180 s | Silica sol modified with epoxy silane and amino silane (Silquest A-1100) |
| 10 | 36 s | 191 s | Silica sol modified with epoxy silane and amino silane (Silquest A-1130) |
| 11 | 38 s | 204 s | Silica sol modified with epoxy silane and amino silane (Silquest A-1130) |

It can be noted that formulations 9-11 based on dually silanized colloidal silica dispersions show improved early hardness compared to control sample (No. 7) and mono-silanized colloidal silica dispersions (No. 8).

Water Resistance (24 h) Test 10 drops of water were placed on a 24 h (20° C.) old film, as a substrate, with a clear film of colloidal silica. A 50 ml cup was placed over the drops to protect them from evaporation. After 24 h the plates were analysed in a scale from 1-5.

The scale was; 1: Film "dissolved"
2: Partly dissolved
3: Impact on the film
4: Some impact on the film
5: No impact

TABLE 14

Water resistance (24 h) for wood lacquer formulations of table 9

| No | Water Resistance | Note |
|---|---|---|
| 1 | 5 | Reference sample |
| 2 | 1 | Silica sol modified with only epoxy silane, reference |
| 3 | 5 | Silica sol modified epoxy silane and ureido silane |
| 4 | 5 | Silica sol modified epoxy silane and ureido silane |
| 5 | 4 | Silica sol modified epoxy silane and acrylamido silane |
| 6 | 4 | Silica sol modified epoxy silane and acrylamido silane |

TABLE 15

Water resistance (24 h) for epoxy lacquer formulations of table 11

| No | Water Resistance | Note |
|---|---|---|
| 7 | 4 | Reference sample |
| 8 | 4 | Silica sol modified with only epoxy silane, reference |
| 9 | 4 | Silica sol modified with epoxy silane and amino silane (Silquest A-1100) |
| 10 | 4 | Silica sol modified with epoxy silane and amino silane (Silquest A-1130) |
| 11 | 4 | Silica sol modified with epoxy silane and amino silane (Silquest A-1130) |

Wood Lacquer Formulations (No 1-6)

From wood lacquer formulations, it can be seen that significantly better water resistance is obtained for silanized silica particles modified by both ureido or acrylamido-functionalized silane; and epoxy silane compared to epoxy.

Epoxy Lacquer Formulations (7-11)

The water resistance is not affected in a negative way for any of the samples.

The invention claimed is:
1. A method of producing an aqueous dispersion of silanized colloidal silica particles comprising mixing in an aqueous medium a) at least one silane compound containing an epoxy-functionality, b) at least one silane compound having no epoxy-functionality capable of modifying colloidal silica particles and comprising at least one of an amido-functionality or an ureido-functionality, and c) colloidal silica particles having an average particle diameter ranging from about 3 to about 50 nm in any order to form an aqueous dispersion of silanized colloidal silica particles containing silane compounds originating from a) and b), wherein the weight ratio of a) and b) to silica is from about 0.01 to about 0.5 and the silica content in the dispersion is from about 20 to about 80 wt %.

2. The method according to claim 1, wherein the silanized colloidal silica particles are capable of imparting hardness and/or water resistance to lacquers.

3. The method according to claim 1, wherein the weight ratio of b) to a) is from about 2 to about 0.1.

4. The method according to claim 1, further comprising mixing the aqueous dispersion with a lacquer.

5. The method according to claim 2, wherein the weight ratio of b) to a) is from about 2 to about 0.1.

6. The method according to claim 4, wherein the weight ratio of b) to a) is from about 2 to about 0.1.

7. The method according to claim 2, further comprising mixing the aqueous dispersion with a lacquer.

8. An aqueous dispersion obtained by the method according to claim 1.

9. An aqueous dispersion comprising silanized colloidal silica particles having an average particle diameter ranging from about 3 to about 50 nm, wherein the silanized colloidal silica particles comprise silane groups originating from a) at least one silane compound containing an epoxy-functionality and b) at least one silane compound having no epoxy-functionality and comprising at least one of an amido-functionality or an ureido-functionality, wherein the weight ratio of both a) and b) to silica ranges from about 0.01 to about 0.5 and the silica content on the dispersion is from about 20 to about 80 wt %.

10. The aqueous dispersion according to claim 9, wherein the silanized colloidal silica particles are capable of imparting improved hardness and/or water resistance to a lacquer.

11. The aqueous dispersion according to claim 9, wherein the weight ratio of b) to a) ranges from about 2 to about 0.1.

12. The aqueous dispersion according to claim 9, further comprising a lacquer.

13. The aqueous dispersion according to claim 10, wherein the weight ratio of b) to a) ranges from about 2 to about 0.1.

14. The aqueous dispersion according to claim 11, further comprising a lacquer.

* * * * *